US 009884466B2

(12) United States Patent
Yasuhara et al.

(10) Patent No.: US 9,884,466 B2
(45) Date of Patent: Feb. 6, 2018

(54) FIBER-REINFORCED RESIN MEMBER (71) Applicant: HONDA MOTOR CO., LTD., Minato-ku, Tokyo (JP)

(72) Inventors: Shigeto Yasuhara, Wako (JP); Tomoya Yabu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 142 days.

(21) Appl. No.: 14/897,541

(22) PCT Filed: Jun. 11, 2014

(86) PCT No.: PCT/JP2014/065445
§ 371 (c)(1),
(2) Date: Dec. 10, 2015

(87) PCT Pub. No.: WO2014/200015
PCT Pub. Date: Dec. 18, 2014

(65) Prior Publication Data
US 2016/0136921 A1 May 19, 2016

(30) Foreign Application Priority Data
Jun. 12, 2013 (JP) .................................. 2013-123787

(51) Int. Cl.
*B32B 3/28* (2006.01)
*C08J 5/04* (2006.01)
(Continued)

(52) U.S. Cl.
CPC .............. *B32B 3/28* (2013.01); *B29C 70/228* (2013.01); *B32B 3/02* (2013.01); *B32B 5/12* (2013.01);
(Continued)

(58) Field of Classification Search
CPC ...................................................... B32B 3/28
(Continued)

(56) References Cited

U.S. PATENT DOCUMENTS

2004/0241415 A1    12/2004  Wadahara et al.
2005/0147804 A1*   7/2005   Harada ................... F16F 7/124
                                                     428/292.1
2012/0270030 A1    10/2012  Kawabe

FOREIGN PATENT DOCUMENTS

JP    2001-208120 A    8/2001
JP    2001341189 A    12/2001
(Continued)

OTHER PUBLICATIONS

Office Action dated Feb. 6, 2017 to corresponding European Patent Application No. 14810476.3.
(Continued)

*Primary Examiner* — Brent T O'Hern
(74) *Attorney, Agent, or Firm* — Carrier Blackman & Associates, P.C.; William D. Blackman; Joseph P. Carrier (57) ABSTRACT Since a continuous fiber of a fiber-reinforced resin member includes an axial fiber aligned in the axial direction and an axially right-angled fiber aligned at right angles to the axial direction, and the density of the axially right-angled fiber of a first layer on the outer side of the corner part is made higher than the density of the axially right-angled fiber of a second layer on the inner side of the corner part, when an axial load is input and the fiber-reinforced resin member breaks, the axially right-angled fiber disposed at high density in the outside first layer of the corner part is actively stretched and breaks, thereby enabling a large energy-absorbing effect to be exhibited. Moreover, the fiber-reinforced resin member has a simple structure in which merely the density of the axially right-angled fiber in its interior is changed, thereby minimizing any increase in the production cost.

13 Claims, 6 Drawing Sheets (51) Int. Cl.

| | | |
|---|---|---|
| *F16F 7/12* | (2006.01) | |
| *B32B 5/14* | (2006.01) | |
| *B32B 27/06* | (2006.01) | |
| *B32B 27/20* | (2006.01) | |
| *B32B 3/02* | (2006.01) | |
| *B32B 5/12* | (2006.01) | |
| *D06M 15/19* | (2006.01) | |
| *B32B 27/08* | (2006.01) | |
| *B32B 27/18* | (2006.01) | |
| *B32B 27/32* | (2006.01) | |
| *B32B 27/34* | (2006.01) | |
| *B29C 70/22* | (2006.01) | |

(52) U.S. Cl.
CPC ............... *B32B 5/14* (2013.01); *B32B 27/06* (2013.01); *B32B 27/08* (2013.01); *B32B 27/18* (2013.01); *B32B 27/20* (2013.01); *B32B 27/32* (2013.01); *B32B 27/34* (2013.01); *C08J 5/04* (2013.01); *D06M 15/19* (2013.01); *F16F 7/124* (2013.01); *B32B 2250/20* (2013.01); *B32B 2260/023* (2013.01); *B32B 2260/046* (2013.01); *B32B 2262/00* (2013.01); *B32B 2262/101* (2013.01); *B32B 2262/106* (2013.01); *B32B 2307/518* (2013.01); *B32B 2307/56* (2013.01); *B32B 2605/00* (2013.01); *B32B 2605/08* (2013.01)

(58) Field of Classification Search
USPC .......................................................... 428/77
See application file for complete search history.

(56) References Cited

FOREIGN PATENT DOCUMENTS

| | | |
|---|---|---|
| JP | 2005-193755 A | 7/2005 |
| JP | 2007-009028 A | 1/2007 |
| JP | 2008-006814 A | 1/2008 |
| JP | 4133840 B2 | 8/2008 |
| JP | 2010-138953 A | 6/2010 |
| JP | 2011255533 A | 12/2011 |
| WO | 2014/069108 A1 | 5/2014 |

OTHER PUBLICATIONS

Official Communication dated Jul. 13, 2016 corresponding to Japanese Patent Application No. 2015-522824.

\* cited by examiner

FIBER-REINFORCED RESIN MEMBER

TECHNICAL FIELD

The present invention relates to a fiber-reinforced resin member that includes a fiber-reinforced resin layer in which a continuous fiber is reinforced by a synthetic resin, the fiber-reinforced resin layer having a corner part in an axially right-angled cross section, which is orthogonal with respect to an axial direction thereof.

BACKGROUND ART

An energy-absorbing body in which a plurality of fiber-reinforced resin members having fiber bundles of continuous fibers embedded in a matrix resin are layered so that the directions of alignment of the continuous fibers intersect each other, and the layers of the plurality of fiber-reinforced resin members are stitched by a binding thread so that it extends through in the thickness direction is known from Patent Document 1 below. This energy-absorbing body breaks so as to separate into two layers via a middle part in the thickness direction while breaking the binding thread when a compressive load is input, thereby exhibiting an energy-absorbing effect.

RELATED ART DOCUMENTS

Patent Documents

Patent Document 1: Japanese Patent No. 4133840

SUMMARY OF THE INVENTION

Problems to be Solved by the Invention

However, the above conventional arrangement has the problems that not only does the production cost increase due to the continuous fiber forming a three-dimensional woven fabric, but it is also necessary to increase the number of binding threads in order to enhance the energy-absorbing effect because of the energy-absorbing effect being exhibited by the binding threads being broken, thus increasing the number of stitching steps and further increasing the production cost. Moreover, when the number of binding threads is increased, it becomes difficult for the binding thread to break when a compressive load is input, and the amount of energy absorbed when breaking so as to separate into two layers via the middle part in the thickness direction increases, but there is a possibility that the number of continuous fibers aligned so as to intersect each other will decrease and the strength of the energy-absorbing body itself will deteriorate. Furthermore, since energy is absorbed by separation into two layers via the middle part in the thickness direction, the influence of the resin on the energy-absorbing characteristics is large, and there is a possibility that the energy-absorbing characteristics will become unstable due to environmental factors such as temperature change.

The present invention has been accomplished in light of the above circumstances, and it is an object thereof to provide a fiber-reinforced resin member that can exhibit a large energy-absorbing effect when a compressive load is input in the axial direction while having a simple structure.

Means for Solving the Problems

In order to attain the above object, according to a first aspect of the present invention, there is provided a fiber-reinforced resin member comprising a fiber-reinforced resin layer in which a continuous fiber is reinforced by a synthetic resin, the fiber-reinforced resin layer comprising a corner part in an axially right-angled cross section, which is orthogonal with respect to an axial direction thereof, wherein the continuous fiber comprises an axial fiber aligned in the axial direction and an axially right-angled fiber aligned at right angles to the axial direction, and density of the axially right-angled fiber on an outer side of the corner part is made higher than density of the axially right-angled fiber on an inner side of the corner part.

Further, according to a second aspect of the present invention, in addition to the first aspect, the fiber-reinforced resin layer comprises a plurality of layers that are layered, the synthetic resin of the layer disposed on the inner side of the corner part is a difficultly expandable thermoplastic resin that has high compressive strength, and the synthetic resin of the layer disposed on the outer side of the corner part is an easily expandable thermoplastic resin that has low compressive strength.

Furthermore, according to a third aspect of the present invention, in addition to the second aspect, the fiber-reinforced resin layer comprises a flat part that is continuous with the corner part.

Moreover, according to a fourth aspect of the present invention, in addition to any one of the first to third aspects, the fiber-reinforced resin layer has the axial fiber disposed adjacent to a bent part of the axially right-angled fiber.

Further, according to a fifth aspect of the present invention, in addition to any one of the first to fourth aspects, the fiber-reinforced resin member has a cross section that has a point-symmetric shape.

Furthermore, according to a sixth aspect of the present invention, in addition to the first to fifth aspects, in an axially end part of the fiber-reinforced resin member, the layer disposed on the inner side projects further in the axial direction than the layer disposed on the outer side.

A first flat part 12 and a second flat part 14 of an embodiment correspond to the flat part of the present invention, a first corner part 13 of the embodiment corresponds to the corner part of the present invention, a first layer 17 of the embodiment corresponds to the layer of the present invention that is layered on the outer side, and a second layer 18 of the embodiment corresponds to the layer of the present invention that is layered on the inner side.

Effects of the Invention

In accordance with the first aspect of the present invention, the fiber-reinforced resin member includes a fiber-reinforced resin layer in which a continuous fiber is reinforced by means of a synthetic resin, the fiber-reinforced resin layer including a corner part in an axially right-angled cross section, which is orthogonal with respect to the axial direction. Since the continuous fiber includes an axial fiber aligned in the axial direction and an axially right-angled fiber aligned at right angles to the axial direction, and the density of the axially right-angled fiber on the outer side of the corner part is made higher than the density of the axially right-angled fiber on the inner side of the corner part, when an axial load is input and the fiber-reinforced resin member breaks, the axially right-angled fiber disposed in the outside layer of the corner part at high density is actively stretched and breaks, thereby enabling a large energy-absorbing effect to be exhibited. Moreover, the fiber-reinforced resin member has a simple structure in which merely the density of the axially right-angled fiber in its interior is changed, thereby minimizing any increase in the production cost. Furthermore, since the resin has little influence on the energy-absorbing characteristics, it is possible to obtain stable energy-absorbing characteristics regardless of environmental factors such as temperature change.

Furthermore, in accordance with the second aspect of the present invention, since the fiber-reinforced resin layer includes a plurality of layers that are layered, the synthetic resin of the layer disposed on the inner side of the corner part is a difficultly expandable thermoplastic resin that has high compressive strength, and the synthetic resin of the layer disposed on the outer side of the corner part is an easily expandable thermoplastic resin that has low compressive strength, when the situation is normal, while ensuring the strength of the fiber-reinforced resin member by means of the inside layer of the corner part, which has high compressive strength, the outside layer of the corner part, which has low compressive strength, breaks and expands on the input of an axial load, thus breaking the axially right-angled fiber disposed therein and thereby enabling an energy-absorbing effect to be efficiently exhibited.

Moreover, in accordance with the third aspect of the present invention, since the fiber-reinforced resin layer includes a flat part that is continuous with the corner part, when an axial load is input, the axial fiber of the flat part first undergoes layer separation, thus triggering breakage of the axially right-angled fiber of the corner part and thereby promoting breaking of the axially right-angled fiber.

Furthermore, in accordance with the fourth aspect of the present invention, since the fiber-reinforced resin layer has the axial fiber disposed adjacent to a bent part of the axially right-angled fiber, when an axial load is input and the axially right-angled fiber breaks, lateral movement of the axially right-angled fiber is prevented by means of the axial fiber, thereby enabling the axially right-angled fiber to be reliably broken.

Moreover, in accordance with the fifth aspect of the present invention, since the fiber-reinforced resin member has a cross section that has a point-symmetric shape, the fiber-reinforced resin member is prevented from tilting with respect to the axis when an axial load is input, thus enabling the fiber-reinforced resin member to break over a long distance in the axial direction and thereby enhancing the energy-absorbing effect.

Furthermore, in accordance with the sixth aspect of the present invention, since in an axially end part of the fiber-reinforced resin member, the layer disposed on the inner side projects further in the axial direction than the layer disposed on the outer side, when an axial load is input the inside layer first breaks, and then the outside layer breaks, thus enabling the amount of energy absorbed to gradually increase and stable energy absorption to be achieved.

EXPLANATION OF REFERENCE NUMERALS AND SYMBOLS

11 Fiber-reinforced resin member
12 First flat part (flat part)
13 First corner part (corner part)
14 Second flat part (flat part)
17 First layer (layer that is layered on the outer side)
18 Second layer (layer that is layered on the inner side)
19 Axial fiber
20 Axially right-angled fiber

MODES FOR CARRYING OUT THE INVENTION

A first embodiment of the present invention is explained below by reference to FIG. 1 to FIG. 5.

First Embodiment

Figure 1:
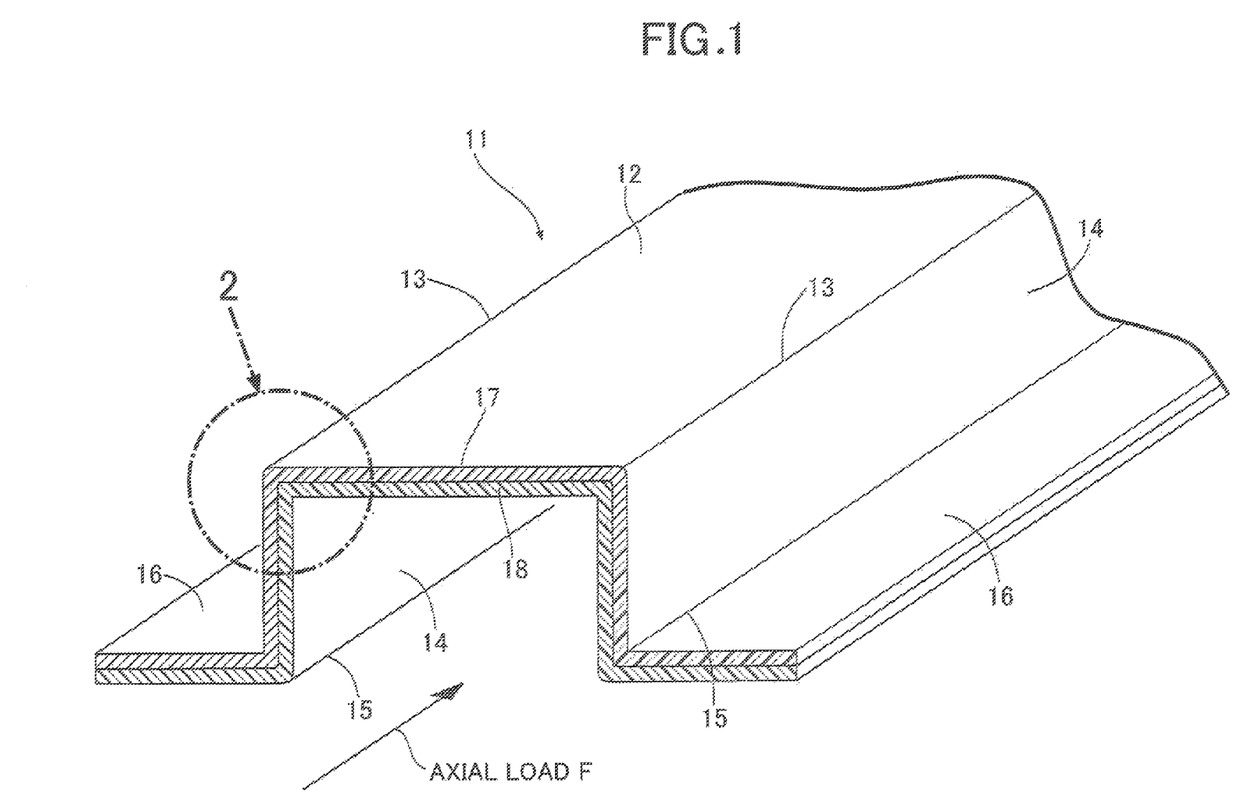
FIG. 1 is a perspective view of a fiber-reinforced resin member. (first embodiment)

As shown in FIG. 1, a fiber-reinforced resin member 11, which is used as an automobile frame, etc., includes a first flat part 12, a pair of first corner parts 13 and 13 that bend at right angles from the first flat part 12, a pair of second flat parts 14 and 14 that are continuous with the pair of first corner parts 13 and 13, and a pair of flange parts 16 and 16 that bend at right angles, in opposite directions, from the pair of second flat parts 14 and 14, and has a hat-shaped cross section that is constant in the axial direction.

Figure 2:
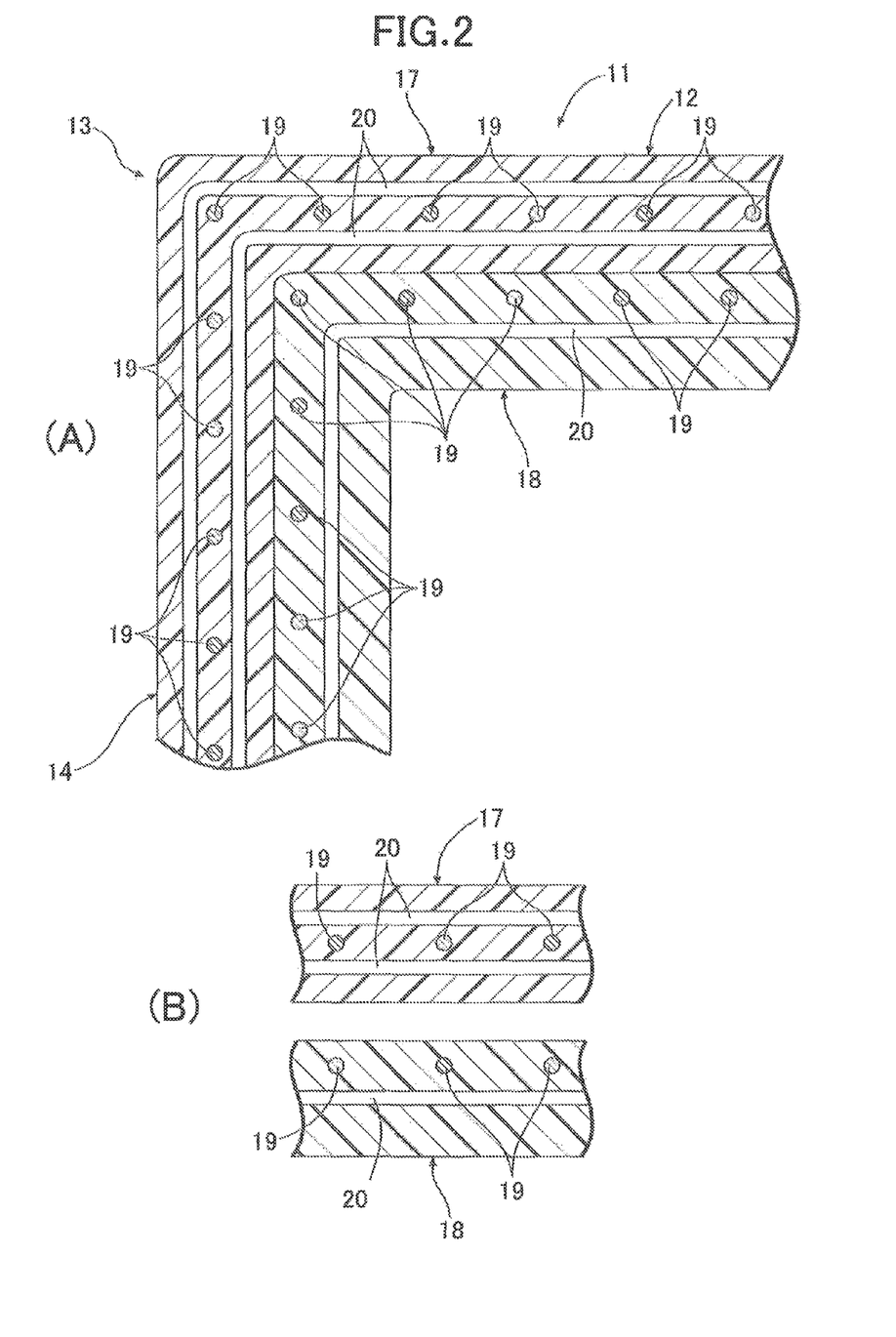
FIG. 2 is an enlarged view of part 2 in FIG. 1. (first embodiment)

FIG. 2 is an enlarged sectional view of the first corner part 13 of the fiber-reinforced resin member 11; the fiber-reinforced resin layer of the fiber-reinforced resin member 11 is formed as a bilayer by layering a first layer 17 on the outer side in the bending direction of the first corner part 13 and a second layer 18 on the inner side in the bending direction of the first corner part 13.

The first layer 17 on the outer side of the first corner part 13 is formed from one layer (also referred to as a sub-layer herein) of axial fibers 19, disposed in parallel to each other and extending in the axial direction, and two layers (also referred to as sub-layers herein) of axially right-angled fibers 20, layered on opposite sides of the layer of axial fibers 19 and extending at right angles to the axial direction. The axial fibers 19 and the axially right-angled fibers 20 are continuous fibers made of glass or carbon, and a matrix resin is a polypropylene whose volume easily expands when crumpled due to its relatively low compressive strength.

The second layer 18 on the inner side of the first corner part 13 is formed from one layer (also referred to as a sub-layer herein) of axial fibers 19, disposed in parallel to each other and extending in the axial direction, and one layer (also referred to as a sub-layer herein) of axially right-angled fibers 20, layered on one side of the layer of axial fibers 19 and extending at right angles to the axial direction. The axial fibers 19 and the axially right-angled fibers 20 are continuous fibers made of glass or carbon, and a matrix resin is a nylon whose volume hardly expands when crumpled due to its relatively high compressive strength.

Therefore, in the first corner part 13, the density of the axially right-angled fibers 20 in the outer side portion in the bending direction (first layer 17) is high, and the density of the axially right-angled fibers 20 in the inner side portion in the bending direction (second layer 18) is low.

In the explanation above, the fiber-reinforced resin member 11 is a bilayer structure of the first layer 17 and the second layer 18, but the number of layers layered is not limited to two layers and can be set freely. Furthermore, the number of layers of the axial fibers 19 and the axially right-angled fibers 20 in the interior of the first layer 17 and the second layer 18 is also any number. Furthermore, the axial fibers 19 and the axially right-angled fibers 20 may be interwoven or may be simply superimposed on one another.

As is clear from FIG. 1, since a second corner part 15 bends in the opposite direction with respect to the first corner part 13, the first layer 17 is positioned on the inner side in the bending direction, and the second layer 18 is positioned on the outer side of the bend. Therefore, in the second corner part 15, it is necessary for the density of the axially right-angled fibers 20 of the second layer 18 to be higher than the density of the axially right-angled fibers 20 of the first layer 17. It is desirable to carry out switching of the density of the axially right-angled fibers 20 continuously between the first corner part 13 and the second corner part 15 so that the strength does not suddenly vary in the second flat part 14 sandwiched between the first corner part 13 and the second corner part 15.

The operation of the embodiment of the present invention having the above arrangement is now explained.

Figure 3:
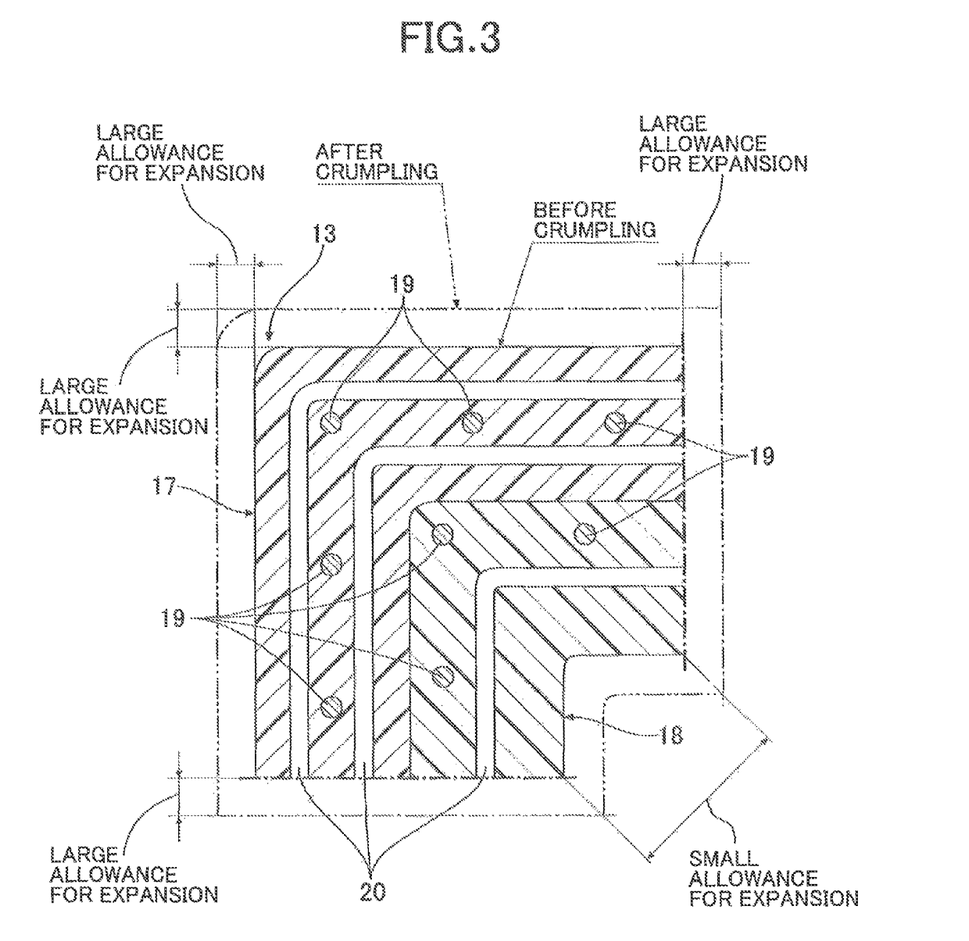
FIG. 3 is a diagram for explaining deformation of a cross section of a corner part when an axial load is input. (first embodiment)

When a strong compressive load in the axial direction is input into the fiber-reinforced resin member 11 due to a vehicle collision, etc., the matrix resin becomes crumpled due to buckling and is crushed, and the cross section expands. FIG. 3 schematically shows expansion of a cross section of the first corner part 13; when the cross section expands from the state shown by the solid line to the state shown by the chain line, there is hardly any increase in the peripheral length of the inner side of the first corner part 13, whereas the peripheral length of the outer side of the first corner part 13 increases greatly.

As a result, the axially right-angled fibers 20 of the first layer 17 on the outer side are strongly stretched and made to break, thus absorbing collision energy. In this process, since the axially right-angled fibers 20 of the first layer 17 are disposed at a higher density than that of the axially right-angled fibers 20 in the second layer 18, it is possible to enhance the energy-absorbing performance by increasing the number of axially right-angled fibers 20 that break. Furthermore, since the axial fibers 19 are disposed so as to be adjacent to the inner side of a bent part of the axially right-angled fibers 20 that bends at right angles within the first layer 17 of the first corner part 13, it is possible to prevent the axially right-angled fibers 20, which have been stretched, from moving toward the inner side in the bending direction by means of the axial fibers 19, thereby promoting breaking of the axially right-angled fibers 20.

Moreover, since the matrix resin of the first layer 17 is a polypropylene that has a relatively low compressive strength and whose volume easily expands when crumpling, and the matrix resin of the second layer 18 is a nylon that has a relatively high compressive strength and whose volume hardly expands when crumpling, it is possible to make the first layer 17 expand greatly when an axial load is input, thus breaking effectively the axially right-angled fibers 20 and thereby further enhancing the energy-absorbing performance. Furthermore, since the second layer 18, which does not actively contribute to energy absorption, has high strength, the strength of the fiber-reinforced resin member 11 can be ensured when the situation is normal in the absence of a vehicle collision.

Figure 4:
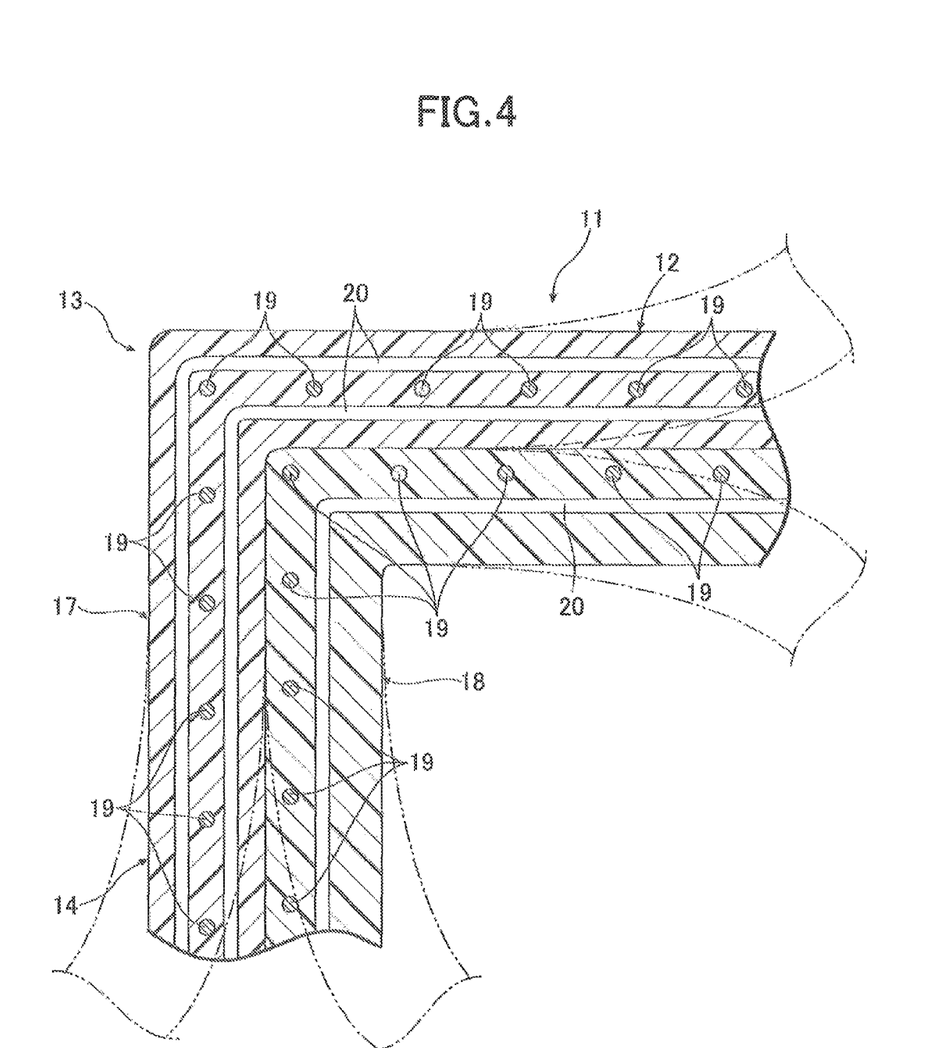
FIG. 4 is a diagram for explaining layer separation of a flat part when an axial load is input. (first embodiment)

Moreover, as shown in FIG. 4, since, when an axial load is input, the first flat part 12 and the second flat part 14, which sandwich the first corner part 13, undergo layer separation at the border between the first layer 17 and the second layer 18, this becomes a trigger, thus promoting crumpling of the first corner part 13 and thereby further enhancing the energy absorption.

Figure 5:
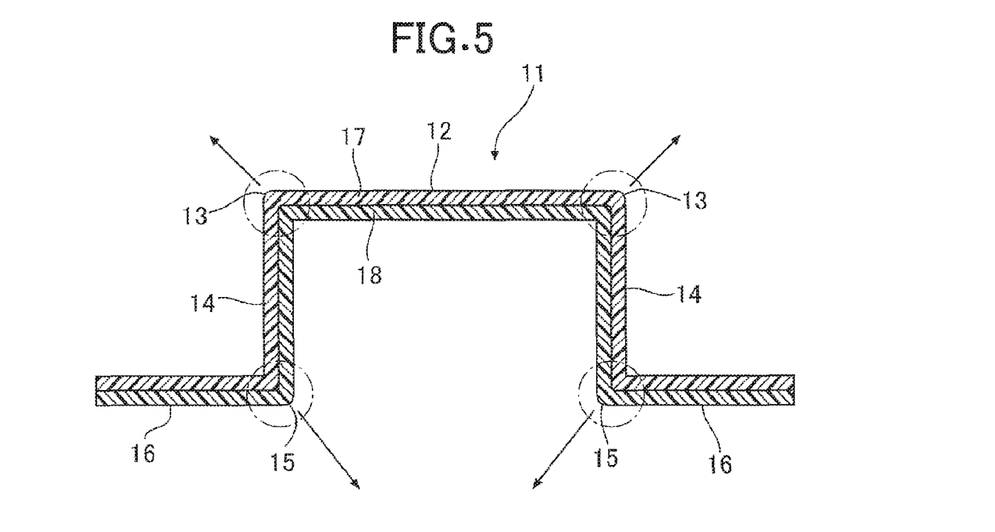
FIG. 5 is a diagram for explaining the direction of expansion of a first corner part and a second corner part. (first embodiment)

Energy absorption in the first corner part 13 is explained above, but the second corner part 15 also exhibits an energy-absorbing performance in the same manner. As shown in FIG. 5, since the hat-shaped cross section fiber-reinforced resin member 11 includes the first corner part 13 and the second corner part 15, which expand in opposite directions, it is possible to efficiently enhance the tensile strength of the axially right-angled fibers 20 when an axial load is input, thereby enhancing the energy-absorbing performance. The fiber-reinforced resin member 11 has a simple structure in which merely the density of the axially right-angled fibers 20 in its interior is changed, thereby minimizing any increase in the production cost. Furthermore, since the resin has little influence on the energy-absorbing characteristics, it is possible to obtain stable energy-absorbing characteristics regardless of environmental factors such as temperature change.

Figure 6:
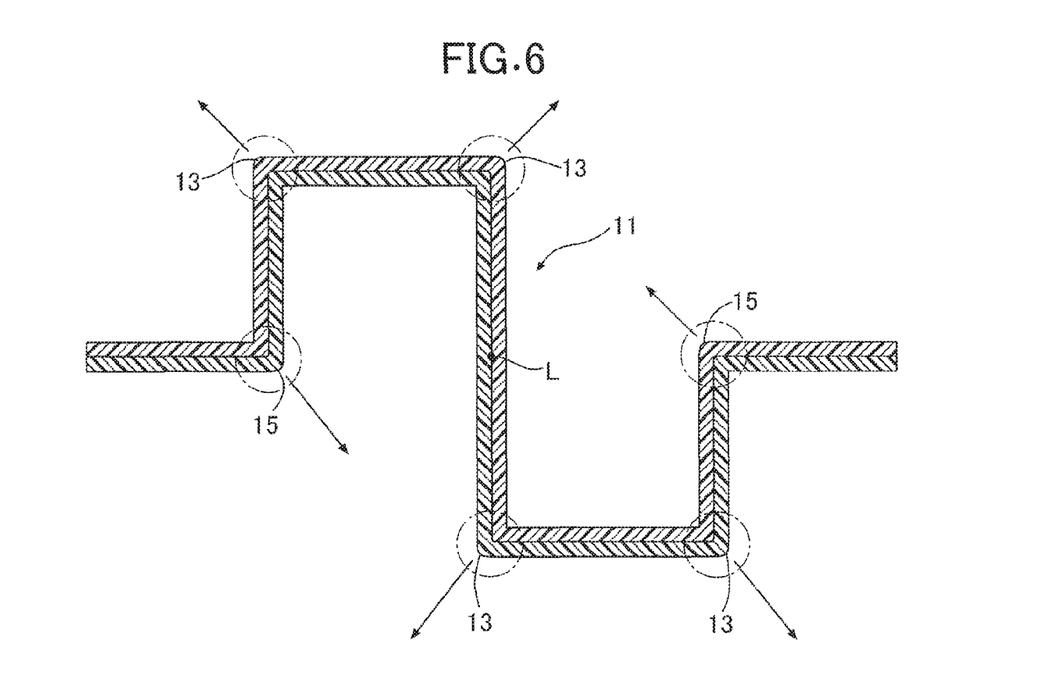
FIG. 6 is a transverse sectional view of a fiber-reinforced resin member. (second embodiment)

A second embodiment of the present invention is now explained by reference to FIG. 6.

Second Embodiment

The fiber-reinforced resin member 11 of the first embodiment has a hat-shaped cross-sectional shape that is not point-symmetric, but a fiber-reinforced resin member 11 of the second embodiment has a substantially S-shaped cross-sectional shape that is point-symmetric with respect to an axial center L.

In this way, the cross-sectional shape of the fiber-reinforced resin member 11 has point symmetry, and it is thus possible to prevent the fiber-reinforced resin member 11 from tilting with respect to the axial center L when an axial load is input, thereby making the fiber-reinforced resin member 11 crumple reliably throughout a long stroke and enhancing the energy-absorbing performance.

Figure 7:
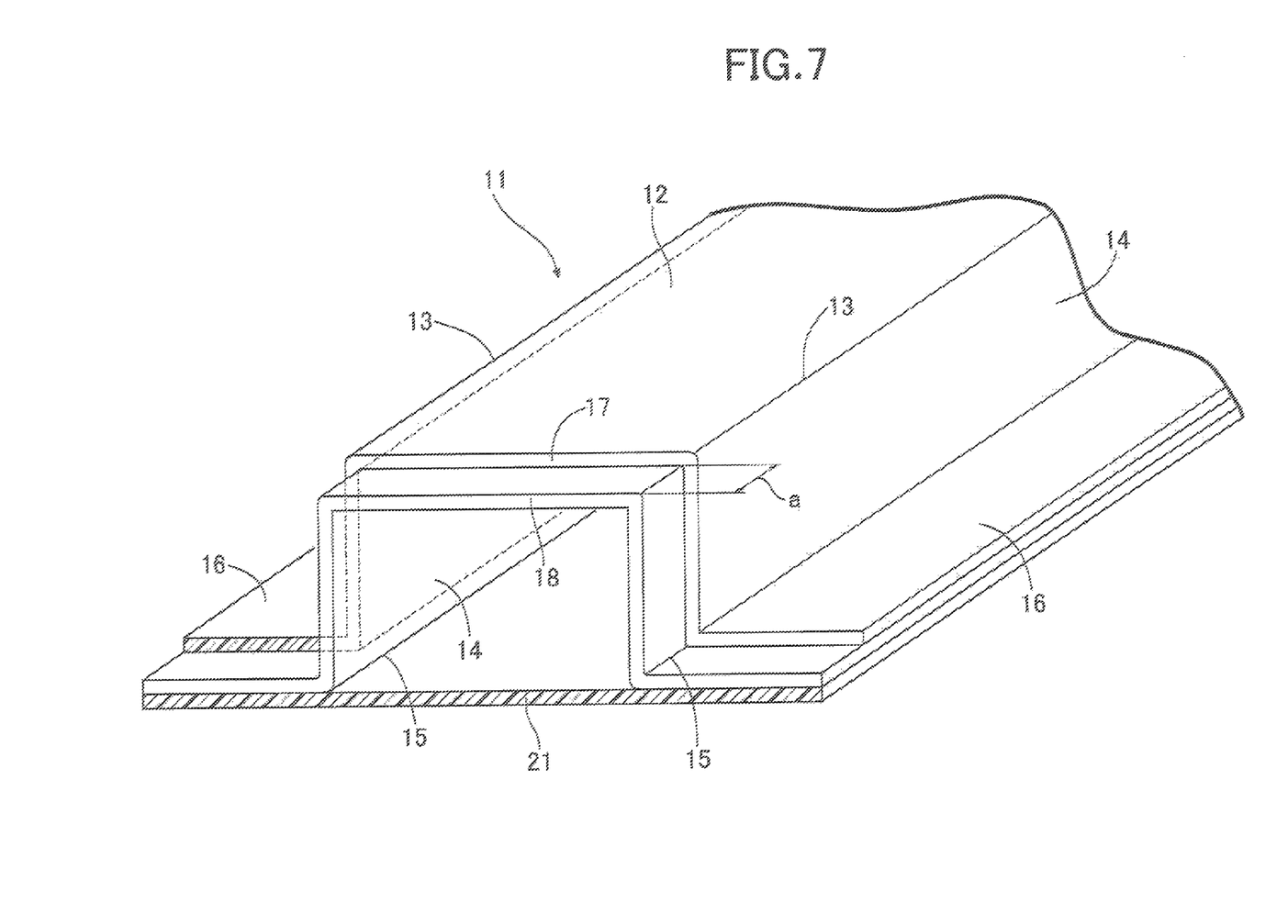
FIG. 7 is a perspective view of a fiber-reinforced resin member. (third embodiment)

A third embodiment of the present invention is now explained by reference to FIG. 7.

Third Embodiment

In the third embodiment, a closed cross-section is formed by joining a plate-shaped fiber-reinforced resin member 21 between a pair of flange parts 16 and 16 of a hat-shaped cross section fiber-reinforced resin member 11. A second corner part 15 is connected to the flange part 16, and since not very much energy-absorbing effect due to breaking of axially right-angled fibers 20 can be expected, a structure in which the density of the axially right-angled fibers 20 on the outer side is made higher than the density of the axially right-angled fibers 20 on the inner side is applied only to a first corner part 13. In an axially end part of the fiber-reinforced resin member 11, an axially end part of a first layer 17 is moved back in the axial direction by a distance a more than an axially end part of a second layer 18. That is, a region within the distance a from the axially end part of the fiber-reinforced resin member 11 is formed only from the second layer 18.

In accordance with the present embodiment, when the fiber-reinforced resin members 11 and 21 crumple due to an axial load, needless to say the first corner part 13 exhibits the same energy-absorbing effects as those of the first embodiment, but in addition thereto only the second layer 18 exposed in the axially end part crumples first, and then both the second layer 18 and the first layer 17 crumple at the same time, thereby enabling stable energy absorption by gradually increasing the amount of energy absorbed.

Embodiments of the present invention are explained above, but the present invention may be modified in a variety of ways as long as the modifications do not depart from the spirit and scope thereof.

For example, it is not always necessary for the fiber-reinforced resin layer of the fiber-reinforced resin member 11 to be divided into multiple layers, and it may be one layer. That is, the density of the axially right-angled fibers 20 should be higher for the outer side of the corner part than the inner side of the corner part.

The invention claimed is:

1. A fiber-reinforced resin member comprising a plurality of fiber-reinforced resin layers laminated one on another in which each of the fiber-reinforced resin layers comprises a synthetic resin reinforced by continuous fibers arranged inside of the synthetic resin, the fiber-reinforced resin layers comprising a corner part in an axially right-angled cross section, which is orthogonal with respect to an axial direction thereof, wherein the continuous fibers comprise axial fibers aligned in the axial direction and axially right-angled fibers aligned at right angles to the axial direction, the plurality of fiber-reinforced resin layers includes a first layer defining an outer side of the corner part and a second layer defining an inner side of the corner part, the first layer is formed of a plurality of sub-layers including a sub-layer formed by the axial fibers and a plurality of sub-layers formed by the axially right-angled fibers laminated on an upper side and a lower side of the sub-layer formed by the axial fibers so as to clamp the sub-layer formed by the axial fibers therebetween, the second layer is formed of a plurality of sub-layers including a sub-layer formed by the axial fibers and a sub-layer formed by the axially right-angled fibers laminated on the upper side or the lower side of the sub-layer formed by the axial fibers, the resin member configured so that a density of the axially right-angled fibers in the first layer on the outer side of the corner part is made higher than a density of the axially right-angled fibers in the second layer on the inner side of the corner part.

2. The fiber-reinforced resin member according to claim 1, wherein the synthetic resin of the second layer is a thermoplastic resin that has higher compressive strength and is less easily expandable than the synthetic resin of the first layer.

3. The fiber-reinforced resin member according to claim 2, wherein the fiber-reinforced resin layers comprise a flat part that is continuous with the corner part.

4. The fiber-reinforced resin member according to claim 1, wherein the axial fibers are disposed adjacent to a bent part of the axially right-angled fibers.

5. The fiber-reinforced resin member according to claim 1, wherein the fiber-reinforced resin member has a cross section that has a point-symmetric shape.

6. The fiber-reinforced resin member according to claim 2, wherein in an axially end part of the fiber-reinforced resin member, the second layer projects further in the axial direction than the first layer.

7. The fiber-reinforced resin member according to claim 2, wherein the axial fibers are disposed adjacent to a bent part of the axially right-angled fibers.

8. The fiber-reinforced resin member according to claim 3, wherein the axial fibers are disposed adjacent to a bent part of the axially right-angled fibers.

9. The fiber-reinforced resin member according to claim 2, wherein the fiber-reinforced resin member has a cross section that has a point-symmetric shape.

10. The fiber-reinforced resin member according to claim 3, wherein the fiber-reinforced resin member has a cross section that has a point-symmetric shape.

11. The fiber-reinforced resin member according to claim 4, wherein the fiber-reinforced resin member has a cross section that has a point-symmetric shape.

12. The fiber-reinforced resin member according to claim 3, wherein in an axially end part of the fiber-reinforced resin member, the second layer projects further in the axial direction than the first layer.

13. The fiber-reinforced resin member according to claim 2, wherein the synthetic resin of the first layer comprises polypropylene, and wherein the synthetic resin of the second layer comprises a nylon.

* * * * *